US008856290B2

(12) United States Patent
Couto et al.

(10) Patent No.: US 8,856,290 B2
(45) Date of Patent: Oct. 7, 2014

(54) METHOD AND APPARATUS FOR EXCHANGING CONFIGURATION INFORMATION IN A WIRELESS LOCAL AREA NETWORK

(75) Inventors: Paul Couto, Londonderry, NH (US); Kwoktung B. Lo, Palo Alto, CA (US); Rodney E. Okano, Milpitas, CA (US); Gabriel E. Rubinsky, San Jose, CA (US)

(73) Assignee: General Instrument Corporation, Horsham, PA (US)

( * ) Notice: Subject to any disclaimer, the term of this patent is extended or adjusted under 35 U.S.C. 154(b) by 193 days.

(21) Appl. No.: 13/279,562

(22) Filed: Oct. 24, 2011

(65) Prior Publication Data

US 2013/0103807 A1 Apr. 25, 2013

(51) Int. Cl.
| | | |
|---|---|---|
| *G06F 15/177* | (2006.01) | |
| *H04W 12/06* | (2009.01) | |
| *H04W 84/12* | (2009.01) | |
| *H04W 88/06* | (2009.01) | |
| *H04W 12/04* | (2009.01) | |

(52) U.S. Cl.
CPC .............. *H04W 12/06* (2013.01); *H04W 84/12* (2013.01); *H04W 88/06* (2013.01); *H04L 61/2013* (2013.01); *H04W 12/04* (2013.01)
USPC ........................................................ 709/220

(58) Field of Classification Search
CPC ..... H04W 84/12; H04W 12/04; H04W 12/06; H04W 88/06; H04L 61/2015
USPC ........................................................ 709/220
See application file for complete search history.

(56) References Cited

U.S. PATENT DOCUMENTS

| | | | |
|---|---|---|---|
| 7,343,411 B2 | 3/2008 | Cohen | |
| 7,349,441 B2 * | 3/2008 | Belcea | 370/503 |
| 7,613,142 B2 * | 11/2009 | Molteni et al. | 370/328 |
| 7,974,236 B2 | 7/2011 | Woo | |
| 2004/0095942 A1 * | 5/2004 | Lung | 370/400 |
| 2005/0195781 A1 * | 9/2005 | Ikeda | 370/338 |
| 2006/0039563 A1 | 2/2006 | Carter et al. | |
| 2006/0171388 A1 * | 8/2006 | Ikeda | 370/389 |
| 2006/0276176 A1 * | 12/2006 | Lee et al. | 455/411 |
| 2006/0282541 A1 * | 12/2006 | Hiroki | 709/228 |

(Continued)

OTHER PUBLICATIONS

Wi-Fi Alliance, "Wi-Fi Certified Protected Setup: Easing the User Experience for Home and Small Office Wi-Fi Networks", Dec. 2010.

(Continued)

*Primary Examiner* — Ario Etienne
*Assistant Examiner* — Blake Rubin
(74) *Attorney, Agent, or Firm* — Stewart M. Wiener

(57) ABSTRACT

A method of exchanging configuration information needed to authenticate an unregistered Wi-Fi client device to an access point of a wireless local area network is described. A SSID of the AP and a temporary hidden secondary SSID of the AP are enabled for a preset time period with a residential gateway providing the AP of the WLAN. A message is received in the form of IP UDP packets by the residential gateway to the temporary hidden secondary SSID of the AP during the preset time period requesting network configuration information. The residential gateway transmits the requested network configuration information via return message in the form of IP UDP packets on the temporary hidden secondary SSID of the AP. Additional methods and apparatus are described.

19 Claims, 4 Drawing Sheets

(56) References Cited

U.S. PATENT DOCUMENTS

| | | | |
|---|---|---|---|
| 2007/0076667 A1* | 4/2007 | Kashima et al. | 370/335 |
| 2007/0112948 A1* | 5/2007 | Uhlik | 709/223 |
| 2007/0282996 A1* | 12/2007 | Chaki et al. | 709/223 |
| 2008/0008088 A1* | 1/2008 | Nagarajan et al. | 370/220 |
| 2008/0016556 A1* | 1/2008 | Selignan | 726/7 |
| 2008/0065892 A1* | 3/2008 | Bailey et al. | 713/171 |
| 2008/0109880 A1* | 5/2008 | Shiu et al. | 726/3 |
| 2008/0198826 A1* | 8/2008 | Won | 370/338 |
| 2008/0220741 A1* | 9/2008 | Hung | 455/411 |
| 2008/0250478 A1* | 10/2008 | Miller et al. | 726/5 |
| 2008/0293404 A1* | 11/2008 | Scherzer et al. | 455/426.1 |
| 2008/0320108 A1* | 12/2008 | Murty et al. | 709/220 |
| 2009/0279425 A1* | 11/2009 | Du et al. | 370/216 |
| 2010/0020746 A1* | 1/2010 | Zaks | 370/328 |
| 2012/0184242 A1* | 7/2012 | Li et al. | 455/406 |
| 2012/0209934 A1* | 8/2012 | Smedman | 709/208 |
| 2012/0257543 A1* | 10/2012 | Baum et al. | 370/255 |
| 2013/0041981 A1* | 2/2013 | Kim et al. | 709/217 |

OTHER PUBLICATIONS

Cisco Systems, Inc., Valet/Valet Plus Quick Reference Guide, as published 2010.

* cited by examiner

METHOD AND APPARATUS FOR EXCHANGING CONFIGURATION INFORMATION IN A WIRELESS LOCAL AREA NETWORK

FIELD

Method and apparatus for exchanging Wi-Fi configuration information between a gateway providing an access point of a wireless local area network (WLAN) and an unregistered Wi-Fi client device are described.

BACKGROUND

"Wi-Fi" is a term used to describe a wireless local area network (WLAN) product that is based on IEEE 802.11(a/b/g/n) standards. A Wi-Fi network, or wireless local area network (WLAN) is a local area network including wireless or "Wi-Fi" enabled client devices that are located in the same physical proximity and share resources, such as, Internet connection, printers, and the like. An example of a WLAN is a small office or home office (SOHO) network. Such a network may exist within a home or residential environment and is typically operated by a resident that may not necessarily be skilled with respect to setting up and configuring a WLAN or wireless client devices.

The amount and types of Wi-Fi enabled client devices for use over a home network are continually increasing and include, for instance, computers, notebook computers, tablet computers, smart phones, cameras, media players, photo frames, televisions, gaming devices, and like customer premises equipment (CPE). Thus, a user of the network may need to authenticate new wireless devices to an existing home network as new wireless devices are obtained. However, as discussed above, the typical home user may not necessarily possess any special skills with respect to wireless network configuration and security settings or be trained to have such skills.

A WLAN has an access point (AP) to which wireless devices connect to the network. In some networks, the access point is provided by a residential gateway (RG). A residential gateway refers to a device that connects multiple computers or like client devices to a single cable or digital subscriber line (DSL) for Internet access. A RG will typically include a broadband router and an Ethernet switch for attaching four or more computers by wire. The RG may also include an access point (AP) for wireless transmission as well as the cable or DSL modem. These devices may also be referred to as "home gateway" or an "Internet gateway".

During original set up of an AP of a RG and when it is desired to add new wireless devices to an existing Wi-Fi network, the user, typically the resident of the home, will be required to configure the access point and/or wireless client devices so that the residential gateway recognizes a new client device as an approved device to be authorized connection and access to the network. Set up typically also requires configuration of security options and encryption keys for the network and communications between the residential gateway and wireless client devices. A typical configuration process can require a significant amount of user interaction and knowledge.

For purposes of simplifying this process, particularly for home networks, some wireless client devices and routers have been provided with so-called Wi-Fi Protected Setup (WPS) functionality requiring the end user to sequentially push buttons on the client devices and router to enable automatic set up with only a minimum of user interaction. However, not all wireless client devices include a wireless client card that supports WPS; thus, this set up process is not universally useful for all client devices. As another alternative, configuration settings can be provided to a wireless client device directly via their existence on a USB flash drive. However, not all wireless client devices (smart phones, tablets, etc.) have a full size USB port and such flash drives are prone to becoming lost between times when a user may need to configure or re-configure a client device to the network.

Accordingly, an alternative configuration exchange approach which is user-friendly, security protected and more universally useful is needed. The use of USB flash drives, full size USB ports, and special wireless client cards should not necessarily be required for providing configuration information to a client device so that the same configuration exchange system can be used for all client devices.

SUMMARY

This disclosure describes a method of exchanging configuration information for authenticating an unregistered Wi-Fi client device to an access point (AP) of a wireless local area network (WLAN). A primary service set identifier (SSID) of the AP and a temporary hidden secondary SSID of the AP are enabled for a preset time period with a residential gateway providing the AP of the WLAN. A message is received via wireless communication in the form of Internet Protocol (IP) User Datagram Protocol (UDP) packets by the residential gateway to the temporary hidden secondary SSID of the AP during the preset time period requesting network configuration information. The residential gateway transmits the requested network configuration information via return message wireless communication in the form of IP UDP packets on the temporary hidden secondary SSID of the AP.

This disclosure also describes a method in which a wireless communication profile with a secondary SSID and WPA-PSK encryption is created on the unregistered Wi-Fi client device via software running on the unregistered Wi-Fi client device. A wireless communication command to the secondary SSID in the form of Internet Protocol (IP) User Datagram Protocol (UDP) packets is transmitted from the unregistered Wi-Fi client device to a residential gateway to initialize a configuration session and to provide a cipher type and cipher key for use by the residential gateway. A wireless communication command in the form of IP UDP packets is transmitted from the unregistered Wi-Fi client device to the residential gateway to request configuration information from the residential gateway for an access point (AP) provided by the residential gateway for a wireless local area network (WLAN). A wireless communication response from the residential gateway is received providing a primary SSID, a security key, and a security type of the AP, and the software on the unregistered Wi-Fi client device creates a new wireless communication profile with the primary SSID, the security key, and the security type of the AP.

This disclosure also describes a residential gateway comprising customer premise equipment (CPE) providing an access point (AP) for a wireless local area network (WLAN) and being connectable to a wide area network (WAN) of a service provider providing Internet connectivity to the WLAN. The CPE has a processor with configuration software loaded therein and being configured to enable a primary service set identifier (SSID) of the AP and a temporary hidden secondary SSID of the AP for a preset time period. The configuration software being further configured to receive a message request to the temporary hidden secondary SSID of the AP during the preset time period for network configuration information via wireless communication in the form of Internet Protocol (IP) User Datagram Protocol (UDP) packets and to transmit requested network configuration information via return message wireless communication in the form of IP UDP packets on the temporary hidden secondary SSID of the AP.

Yet further, this disclosure describes at least one non-transitory computer readable storage medium having computer program instructions stored thereon that are arranged to perform the above referenced operations.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
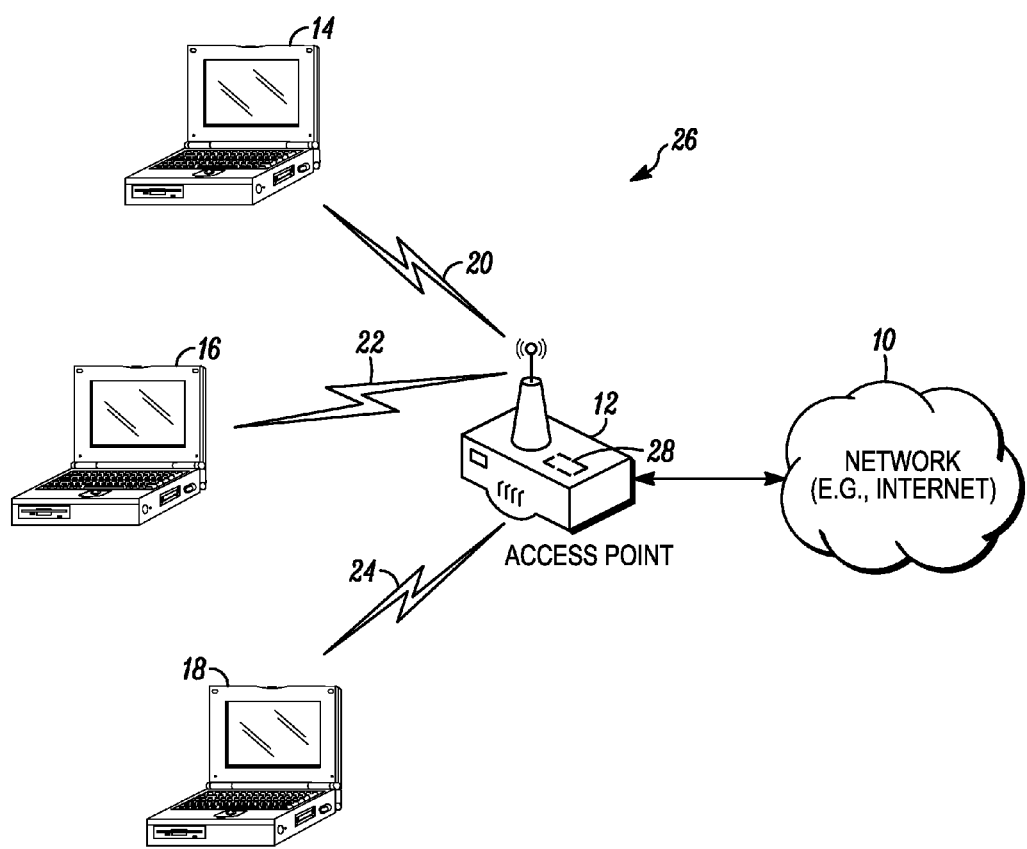
FIG. 1 is a block diagram of an exemplary wireless network in accordance with an embodiment.

As shown in FIG. 1, an access point (AP) can be provided by a residential gateway (RG) 12, such as a DSL gateway or modem, cable gateway or modem, router, or like customer premises device (CPE) connected to a network 10, such as a wide area network (WAN) of a service provider. The connection to network 10 will typically provide connection and access to the Internet. The gateway 12 permits (or prevents) any of a plurality of wireless enabled client devices (such as the laptop computers shown in FIG. 1) 14, 16 and 18 to connect to the network 10 via wireless communications 20, 22 and 24 with the AP. Thus, the RG 12 and client devices 14, 16 and 18 form a wireless local area network (WLAN) 26 in FIG. 1. It should be understood that the Wi-Fi client devices of the WLAN 26 can be of any type including tablet computers, smart phones, personal organizers, and the like.

If any of the wireless client devices 14, 16 and 18 are configured to communicate with the AP, the wireless communications are typically accomplished via secure, encrypted signals. According to the system described herein, if any of the client devices are not yet configured or registered with the AP, the unregistered client device may communicate via wireless communications directly with the RG 12 to request configuration information via wireless communication. Thus, the residential gateway 12 is adapted to facilitate the registration and/or authentication of unregistered Wi-Fi client devices to the WLAN 26 so that the unregistered client devices may become associated with the AP via secure communication.

According to the described configuration exchange system, the universal Wi-Fi configuration (UWC) process provides the end user with an easy and standard configuration method to connect and authenticate a client devices with the AP and home network. The UWC process utilizes Internet Protocol (IP) layer connectivity and provides a software-only solution from the perspective of the wireless client device. Thus, the wireless client device is not required to have a full size USB port or a special type of wireless client card for the purpose of obtaining configuration information. Thus, the client device will have UWC client software loaded therein, and the residential gateway 12 will have UWC server software loaded in a processor 28 therein to facilitate the exchange of configuration information therebetween.

The software-only configuration process described herein is a protocol exchange using IP user datagram protocol (UDP) between an unregistered Wi-Fi client device (such as any of 14, 16 and 18 shown in FIG. 1) and the residential gateway 12. The software-only configuration method is a client/server protocol with the unconfigured wireless client device being responsible for initiating all protocol transactions. In this process, the residential gateway 12 serves the role of a configuration server (UWC server) and only provides this function or a preset limited period of time (T1) after activation by the end user. Thus, it is only during this time (T1) that the residential gateway 12 will respond to a configuration information request from an unregistered client device, and the activation of this role of the gateway 12 and initiation of the T1 time period is under the control and triggered only by end user action, such as by the end user pressing or touching a hard or soft button or the like on the gateway 12. For purposes of example, the preset time period (T1) may be 2 minutes or less to thereby minimize security issues.

For purposes of further enhancing security during a configuration process, the unregistered client device can initiate or trigger any transaction with an optional security key and associated cipher type that can be provided from the client device to the residential gateway 12. Subsequent protocol messages from the residential gateway 12 in its role as a UWC server are encrypted with this key value. Messages from the unconfigured wireless client device are not encrypted because this additional data encryption is not required when using WPA-PSK Wi-Fi PROTECTED ACCESS-Pre-Shared Key (WPA-PSK) security on the wireless connection.

The unregistered client device is recognized by the residential gateway 12 by its Media Access Control (MAC) address. The residential gateway 12 will only permit one unregistered client device at a time to request configuration information. The detection of more than one unregistered client devices requesting configuration information will result in the residential gateway 12 terminating a session with an unregistered client device with a most recent request for configuration information. Thereafter, the residential gateway 12 will permit an existing (or first) session (occurring during T1) with an unregistered client device having an earliest request intact. However, the UWC server (i.e. the gateway 12) will terminate an existing and first configuration session after the time period T1 lapses regardless of whether or not configuration exchange completes or fails to be completed for this client device.

As stated above, the UWC process is a protocol built in IP and UDP. As such, the configuration process is required to incorporate layer-2 or Wi-Fi connectivity which is conducted over an alternative network name or service set identifier (hereinafter referred to as a Universal Wi-Fi Configuration SSID (UWC_SSID)) of the AP and is not otherwise used as part of standard wireless networking with the AP. As an example, the UWC_SSID may be requested to be SSID4 on the assumption that a typical user will not have already configured SSID4. (Wireless chipsets typically support 4 SSIDs.) The UWC_SSID is a hidden SSID, its use is temporary, and it is not broadcasted. In this manner, the UWC_SSID cannot be discovered by unwanted casual scanning of others. In addition, traffic sent via the UWC_SSID is not bridged to other SSIDs, nor is it routed to the wide area network (WAN) interface of customer premise equipment (CPE). WPS-PSK security is enabled for the UWC_SSID using a fixed key known to both the server and the unregistered client device.

The protocol of the above referenced software-only configuration method can run in parallel with Wi-Fi Protected Setup (WPS) support. Thus, pressing a WPS button on the residential gateway 12 can be used to start either of these procedures, as desired.

Figure 2:
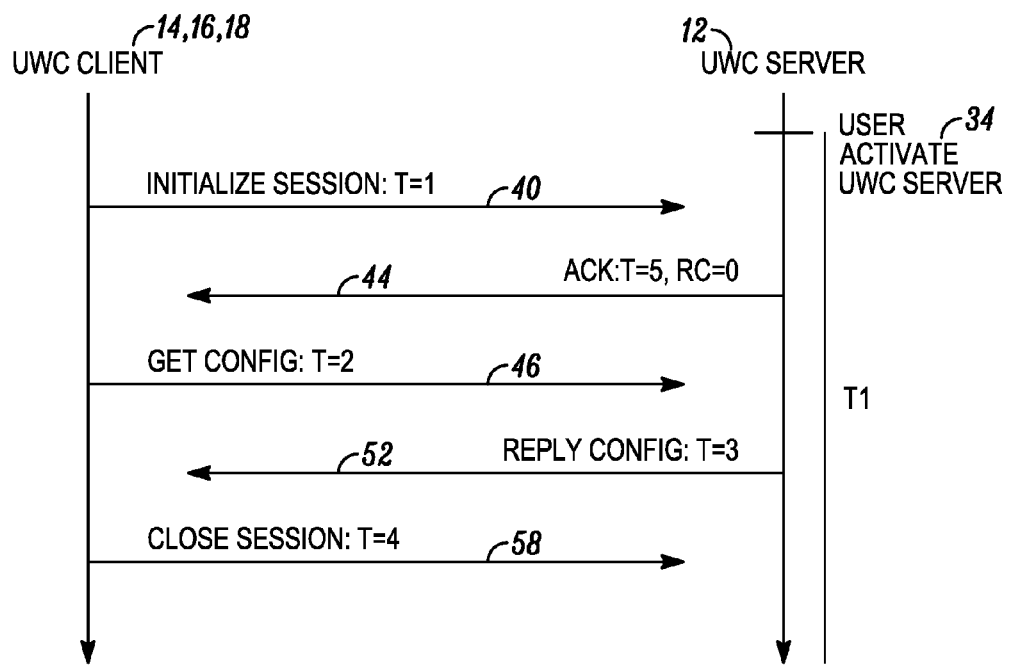
FIG. 2 is a block diagram showing message exchanges between a residential gateway as a server and an unregistered client device in accordance with an embodiment.
Figure 3:
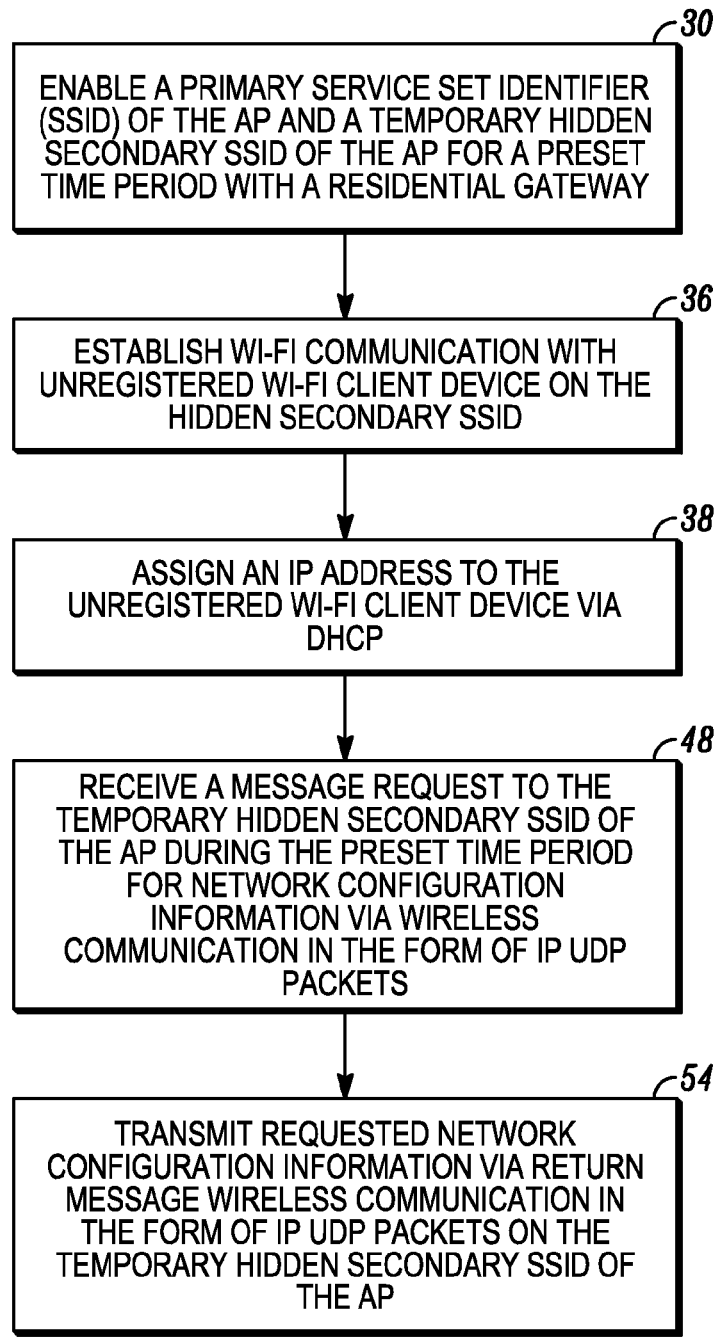
FIG. 3 is a flowchart of process steps performed by the UWC server in accordance with an embodiment.
Figure 4:
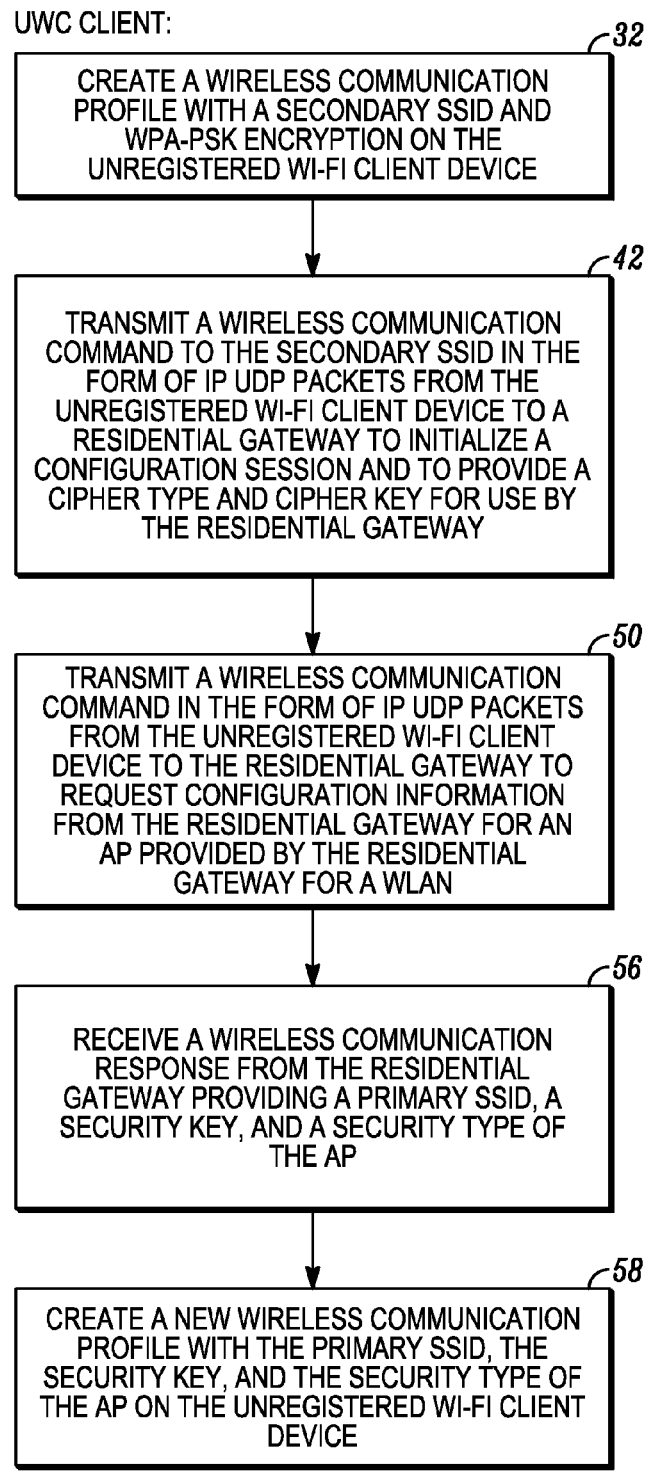
FIG. 4 is a flowchart of process steps performed by the UWC client in accordance with an embodiment.

The steps of the configuration process are described below and shown in FIGS. 2-4 by way of the following example. In this example, the residential gateway 12 has UWC server software loaded therein and is set to enable a primary SSID and a secondary SSID (i.e., UWC_SSID) for a temporary time period (T1), such as 120 seconds. See step 30 in FIG. 3. The unregistered wireless client device has UWC client software loaded and running therein. The software can be loaded within the unregistered client device by any known method. For example, a smart phone may obtain the software by downloading an app via a mobile data connection (i.e., not via the home Wi-Fi network).

When the UWC client software is run on an unregistered client device, it can provide a wizard or like visual graphic and/or audio to the user, for instance via a display screen or speakers of the client device, and can create a wireless communication profile, for instance "WFCFD2" with WPA-PSK encryption. See step 32 in FIG. 4. The wizard may prompt the user to press the WPS button, or the like, provided on the residential gateway 12 when the user is ready to attempt to authenticate or register the unregistered client device to the AP.

When the user depresses the WPS button or the like on the residential gateway 12, this initiates the running of the time period T1 (see 34 in FIG. 2), and initiates the residential gateway 12 functioning as a UWC server. Thus, the UWC server software is run by the residential gateway 12, the residential gateway 12 listens on UDP port (SP1), and a wireless connection is established to the hidden secondary SSID (UWC_SSID) between the residential gateway 12 and unregistered client device. See step 36 in FIG. 3. At this time, the residential gateway 12 uses Dynamic Host Configuration Protocol (DHCP) and assigns an IP address to the unregistered client device. See step 38 in FIG. 3. Here, upon activation of the residential gateway as the UWC server, the software wizard on the unregistered client device causes an "Initialize Session" command to be sent from the unregistered wireless client device to the residential gateway 12. See message 40 in FIG. 2 and step 42 in FIG. 4. This initializes the client-server session between the unregistered client device and the residential gateway 12. The residential gateway 12 then promptly responds to the unregistered client device with a return acknowledgement (ACK) command. See message 44 in FIG. 2.

After the session is initialized and acknowledged as discussed above, the software wizard on the unregistered client device sends a "Get Wi-Fi Configuration" command via wireless communication to the residential gateway 12. See 46 in FIG. 2 and corresponding method steps 48 in FIGS. 3 and 50 in FIG. 4. In response, the residential gateway (functioning as a server in this process) responds with a wireless communication providing the requested configuration information. See 52 in FIG. 2 and corresponding method steps 54 in FIGS. 3 and 56 in FIG. 4. This information can include primary SSID, security key, security type, and serial number of the residential gateway.

Upon receipt of the configuration information, the unregistered client device transmits a "Close Session" command to the residential gateway 12 to close the temporary connection via the UWC_SSID network name and removes the profile "WFCFD2" from its memory. See message 58 in FIG. 2. At this time, the residential gateway 12 also promptly closes the secondary SSID (UWC_SSID).

After successful completion of the above steps, the software wizard creates a new profile on the unregistered client device with the primary SSID, security key and security type in the end user operating system (OS) to convert the client device to a registered or configured Wi-Fi client device relative to the home network and AP. See step 8 in FIG. 4. A secure wireless connection can then be made by the client device to the primary SSID of the AP.

By way of example, the IP UDP packets received and transmitted by the unregistered client devices and the residential gateway 12 can have the following defined UDP payloads (UDP, IP and lower layer headers not being represented):

UWC protocol format is: [V][T][L][UWC_Payload]; where
  V: one byte version field, indicating version of the UWC protocol (It is set to 0x01 currently);
  T: one byte command/data type field, current definitions are defined below;
  L: one byte length field representing the length of the UWC_Payload (for message types that do not have payload, this value is 0x00); and
  UWC_Payload: payload field is format dependent on the "type" field, and is of variable length.

The "Command Type Field" (T) format can be as follows. For a command type field where T=1 (message 40 in FIG. 2), the client device sends an "initiate, send cipher and key" command to the UWC server. The payload field format is [C][Key], where C is Cipher type (C=0x00 for no encryption, and C=0x01 for Blowfish with 128 bit key), and where "Key" is a cipher key, if applicable. For 128 bit key, 16 bytes of key data is required from the client. Thus, the UWC protocol format (i.e., [V][T][L][UWC_Payload]) of an IP packet for a T=1 message type can be: [0x01][0x01][Len][Cipher][Key], where Cipher equals 0x00 for no encryption and 0x01 for 128 bit Blowfish encryption, and where "Key" is only required if Cipher is non-zero. After a T=1 message type is sent by the client device, a server message (T=5, RC=0) of ACK is expected (as described below with respect to T=5 message type).

T=2 messages refer to when the client device sends a "Get Wi-Fi Configuration" command to the UWC server. See 46 in FIG. 2. There is no payload field required for a T=2 message. Thus, the UWC protocol format (i.e., [V][T][L][UWC_Payload]) of an IP packet for a T=2 message type can be: [0x01][0x02][0x00]. After a T=2 message type is sent by the client device, a server message (T=3, or T=5, RC=error) is expected (see below for explanation of T=3 and T=5 message types).

T=3 messages refer to when the UWC server replies to the "Get Wi-Fi Configuration" command of the client device with Wi-Fi configuration information. See message 52 in FIG. 2. The payload field format (before optional encryption) is [SSID][0x00][WiFiKey][0x00][WiFiType][0x00][SN][0x00], where SSID is the primary SSID of the gateway, WiFiKey is the Wi-Fi security key (will be null if WiFiType is "off"), WiFiType is the Wi-Fi security method (either "off", "WPA-PSK" (both v1 and v2 support), "WPA1-PSK" (v1 only), "WPA2-PSK" (v2 only) or "WEP"), and SN is the serial number of the residential gateway. The SSID, WiFiKey, WiFiType and SN are all in ASCII format, and "0x00" is a delimiter to separate the different ASCII strings. Thus, the UWC protocol format (i.e., [V][T][L][UWC_Payload]) of an IP packet for a T=3 message type can be: [0x01][0x03][Len] [SSID][0x00][Key][0x00][Type][0x00][SN][0x00], where SSID is the primary SSID, Key is the wireless security key, and Type is the type of wireless security. SSID, Key and Type are all in ASCII format and the information starting with SSID and onwards in the packet would be encrypted if a key is used.

T=4 messages refer to when the client device sends a "Close Session" command to the UWC server. See message 58 in FIG. 2. The T=4 method has no payload field. Thus, the UWC protocol format (i.e., [V][T][L][UWC_Payload]) of an IP packet for a T=4 message type can be: [0x01][0x04] [0x00]. There is no need for the UWC server to ACK a Close Session command received from a client device. Thus, the UWC server simply closes the session without responding. All the above must occur before the time period (T1) lapses for a successful exchange.

T=5 messages refer to when the UWC server sends a server message to the client device. The payload field format is [RC], where RC is a Reason Code. RC will equal zero for ACK (see message 44 in FIG. 2) and non-zero for NACK. The NACK code represents one of the following error cases: RC=1 for error reading configuration from database; RC=2 for error writing configuration to database; RC=3 for no session, i.e., never started or active with another client; RC=4 bad cipher key format (i.e. key size not 16 bytes); RC=5 for bad packet format, corrupt or illegal message data; RC=6 for bad state for packet, was not expecting message in current state; RC=7 for bad cipher value, only 0x0 or 0x1 currently allowed; and RC=8 for internal issue (no memory available, etc.). Thus, the UWC protocol format (i.e., [V][T][L][UWC_Payload]) of an IP packet for a T=5 message type can be: [0x01][0x05][0x01][RC], where RC is a one byte reason code. The UWC server will terminate the session after sending a NACK.

All of the above messaging steps occur automatically upon activation of the T1 time period by the end user. Thus, the only actions a user needs to take is to ensure that the UWC client software is loaded in the unregistered wireless client device, to start/run the wizard of the software on the unregistered device, and to access and press a button on the gateway as instructed by the wizard. The remaining configuration and security set up is handled via wireless communications under the control of the UWC client software of the unregistered device and the UWC server software of the residential gateway. Thus, the process is essentially accomplished by a software-only system.

The devices, gateways, units, modules, servers, routers, modems and storage discussed above can physically be provided on a circuit board or within an electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software.

While the principles of the invention have been described above in connection with specific devices, systems, and methods, it is to be clearly understood that this description is made only by way of example and not as limitation on the scope of the invention as defined in the appended claims.

We claim:

1. A method of exchanging configuration information for authenticating an unregistered Wi-Fi client device to an access point (AP) of a wireless local area network (WLAN), comprising the steps of:
enabling a primary service set identifier (SSID) of the AP and a temporary hidden secondary SSID of the AP for a preset time period with a residential gateway providing the AP of the WLAN;
receiving a message request with the residential gateway to the temporary hidden secondary SSID of the AP during the preset time period for network configuration information via wireless communication in the form of Internet Protocol (IP) User Datagram Protocol (UDP) packets; and
transmitting requested network configuration information via return message wireless communication in the form of IP UDP packets on the temporary hidden secondary SSID of the AP from the residential gateway;
wherein the residential gateway is configured to permit only one unregistered client device at a time to request configuration information.

2. A method according to claim 1, further comprising the step of establishing, before said receiving step, a Wi-Fi communication connection with the residential gateway to the unregistered Wi-Fi client device on the hidden secondary SSID.

3. A method according to claim 1, further comprising the step of assigning with the residential gateway an IP address to the unregistered Wi-Fi client device via Dynamic Host Configuration Protocol (DHCP).

4. A method according to claim 1, wherein, during said receiving step, the message request is received from the unregistered Wi-Fi client device on the hidden secondary SSID.

5. A method according to claim 1, wherein, during said transmitting step, the return message includes information of at least the primary SSID, a security key, a security type, and a serial number of the residential gateway.

6. A method according to claim 1, further comprising a step of initializing a configuration session by receiving with the residential gateway an initiation message defining a cipher type and cipher key for encryption from the unregistered Wi-Fi client device.

7. A method according to claim 6, wherein, during said transmitting step, the return message is encrypted by the residential gateway based on the cipher type and cipher key received during said initializing step.

8. A method according to claim 1, wherein, after the preset time period is initiated, a configuration session is initiated and the residential gateway listens for wireless messages on a UDP port of the residential gateway, and wherein after the preset time period lapses, the residential gateway terminates the configuration session, if uncompleted.

9. A method according to claim 1, wherein a format of the IP UDP packets of the message request and of the return message includes a version field, a command type field, a payload length field, and a payload field.

10. A method according to claim 1, wherein the residential gateway is selected from a group consisting of a DSL gateway, a DSL modem, a cable gateway, and a cable modem; and further wherein the residential gateway connects the AP to a wide area network (WAN) of a service provider providing Internet connectivity.

11. A method according to claim 1, wherein the unregistered Wi-Fi client device is selected from a group consisting of a computer, a lap-top computer, a tablet computer, and a smart phone.

12. A method according to claim 11, wherein configuration client software is loaded in and run by the unregistered Wi-Fi client device and configuration server software is loaded in and run by the residential gateway for accomplishing the method of exchanging configuration information via a software-implementation process.

13. A method of exchanging configuration information for authenticating an unregistered Wi-Fi client device to an access point (AP) of a wireless local area network (WLAN), comprising the steps of:
- creating a wireless communication profile with a secondary SSID and WPA-PSK encryption on the unregistered Wi-Fi client device via software running on the unregistered Wi-Fi client device;
- transmitting a wireless communication command to the secondary SSID in the form of Internet Protocol (IP) User Datagram Protocol (UDP) packets from the unregistered Wi-Fi client device to a residential gateway providing the AP to initialize a configuration session and to provide a cipher type and cipher key for use by the residential gateway;
- transmitting a wireless communication command in the form of IP UDP packets from the unregistered Wi-Fi client device to the residential gateway to request configuration information of the AP from the residential gateway;
- receiving a wireless communication response from the residential gateway providing a primary SSID, a security key, and a security type of the AP; and
- creating with the software a new wireless communication profile with the primary SSID, the security key, and the security type of the AP on the unregistered Wi-Fi client device;
- wherein the residential gateway is configured to permit only one unregistered client device at a time to request configuration information.

14. A residential gateway, comprising:
- customer premise equipment (CPE) providing an access point (AP) for a wireless local area network (WLAN) and being connectable to a wide area network (WAN) of a service provider providing Internet connectivity to the WLAN;
- said CPE having a processor with configuration software loaded therein and being configured to enable a primary service set identifier (SSID) of said AP and a temporary hidden secondary SSID of said AP for a preset time period; and
- said configuration software being configured to receive a message request to the temporary hidden secondary SSID of said AP during the preset time period for network configuration information via wireless communication in the form of Internet Protocol (IP) User Datagram Protocol (UDP) packets and to transmit requested network configuration information via return message wireless communication in the form of IP UDP packets on the temporary hidden secondary SSID of the AP;
- wherein the CPE is configured to permit only one unregistered client device at a time to request configuration information.

15. A residential gateway according to claim 14, wherein said CPE is selected from a group consisting of a DSL gateway, a DSL modem, a cable gateway, and a cable modem.

16. A residential gateway according to claim 14, wherein said CPE includes a UDP port for listening for and receiving the message request, and wherein said configuration software is configured to establish a Wi-Fi communication connection to an unregistered Wi-Fi client device on the hidden secondary SSID and to assign an IP address to the unregistered Wi-Fi client device via Dynamic Host Configuration Protocol (DHCP).

17. A residential gateway according to claim 16, wherein the return message is encrypted based on a cipher type and cipher key received from an unregistered Wi-Fi client device requesting the configuration information.

18. At least one non-transitory computer readable storage medium having computer program instructions stored thereon that, when executed by a processor, cause the processor to perform the following operations:
- enabling a primary service set identifier (SSID) of an access point (AP) of a wireless local area network (WLAN) and a temporary hidden secondary SSID of the AP for a preset time period;
- receiving a message request to the temporary hidden secondary SSID of the AP during the preset time period for network configuration information via wireless communication in the form of Internet Protocol (IP) User Datagram Protocol (UDP) packets; and
- transmitting requested network configuration information via return message wireless communication in the form of IP UDP packets on the temporary hidden secondary SSID of the AP;
- wherein the AP is configured to permit only one unregistered client device at a time to request configuration information.

19. At least one non-transitory computer readable storage medium having computer program instructions stored thereon that, when executed by a processor, cause the processor to perform the following operations:
- creating a wireless communication profile with a secondary SSID and WPA-PSK encryption;
- transmitting a wireless communication command in the form of Internet Protocol (IP) User Datagram Protocol (UDP) packets to the residential gateway to initialize a configuration session and to provide a cipher type and cipher key for use by the residential gateway;
- transmitting a wireless communication command in the form of IP UDP packets to the residential gateway to request configuration information from the residential gateway;
- receiving a wireless communication response from the residential gateway providing a primary SSID, a security key, and a security type of an access point provided by the residential gateway for a wireless local area network; and
- creating a new wireless communication profile with the primary SSID, the security key, and the security type provided during said receiving step;
- wherein the residential gateway is configured to permit only one unregistered client device at a time to request configuration information.

* * * * *